(12) United States Patent
Dials et al.

(10) Patent No.: US 6,418,012 B1
(45) Date of Patent: Jul. 9, 2002

(54) ASSEMBLY FOR COMPONENTS AND METHOD FOR MOUNTING

(75) Inventors: Edward N. Dials, Apex; Karl K. Dittus, Raleigh; Michael J. Huck, Apex; Ronald G. King, Apex; Suzanne E. Pail, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/596,862

(22) Filed: Jun. 19, 2000

(51) Int. Cl.[7] .................................................. G06F 1/16
(52) U.S. Cl. .................... 361/685; 361/724; 360/97.01; 248/635
(58) Field of Search .................. 361/685, 683–684, 361/686, 724–727; 248/60, 581, 609, 611, 615, 634, 635, 638; 360/97.01, 137; 364/708.1

(56) References Cited

U.S. PATENT DOCUMENTS

| | | | |
|---|---|---|---|
| 5,229,919 A | * 7/1993 | Chen | 361/685 |
| 5,587,889 A | 12/1996 | Sacherman | 361/809 |
| 5,599,080 A | 2/1997 | Ho | 312/334.7 |
| 5,680,293 A | 10/1997 | McAnally et al. | 361/685 |
| 5,682,291 A | 10/1997 | Jeffries et al. | 361/685 |
| 5,768,099 A | 6/1998 | Radloff et al. | 361/685 |
| 5,801,920 A | 9/1998 | Lee | 361/685 |
| 5,828,547 A | 10/1998 | Francovich et al. | 361/685 |
| 5,921,644 A | 7/1999 | Brunel et al. | 312/223.2 |
| 6,088,221 A | * 7/2000 | Bolognia | 361/685 |
| 6,130,817 A | * 10/2000 | Flotho et al. | 361/685 |

FOREIGN PATENT DOCUMENTS

| | | |
|---|---|---|
| DE | 19544186 A1 | 11/1995 |
| DE | 29713122 U1 | 7/1997 |

* cited by examiner

Primary Examiner—Darren Schuberg
Assistant Examiner—Hung Van Duong
(74) Attorney, Agent, or Firm—Joseph A. Sawyer, Jr.

(57) ABSTRACT

A component assembly in accordance with the present invention is disclosed. In a first aspect, the assembly includes at least one component and a bracket for holding at least one component. The bracket has a first side, a second side, and formed features for holding at least one component to the first side of the bracket. The assembly includes a wire spring assembly for securing at least one component to the second side of the bracket. In a second aspect, the component assembly comprises a first component and a second component. The component assembly further includes a bracket for holding the first and second components on the first and second sides of the bracket. The first and second sides of the bracket are oppositely disposed to each other. The bracket includes formed features on the first and second sides for retaining the first and second components. The system further includes first and second wire spring assemblies on each of the first and second sides for securing the first and second components to the bracket. Accordingly, an improved assembly for components and method for mounting is described which overcomes the problems of conventional component assembly and mounting methods. By providing an assembly for components utilizing an improved bracket designed with formed features, and a wire spring assembly the screws associated with mounting the components are minimized. In addition, the components can be attached to the bracket quickly and easily. The assembly is less expensive since the number of parts necessary for assembly is reduced. Finally, the design of the bracket allows for a robust design when mounting the component assembly within a housing.

22 Claims, 9 Drawing Sheets

ASSEMBLY FOR COMPONENTS AND METHOD FOR MOUNTING

FIELD OF THE INVENTION

The present invention relates generally to an assembly for components, and more particularly, to an assembly for peripheral electronic components which may be mounted into a computer housing.

BACKGROUND OF THE INVENTION

Component assembly is commonly known in many different fields, particularly for internal mounting within the housing of electronics, such as computers. Computers are constructed in a manner which allows for internal mounting of peripheral electronic components, such as a CD-ROM (CD) or a Floppy Disk Drive (floppy), within the computer's housing. Conventional assembly and mounting approaches generally require several screws in order to secure a component to a chassis.

A conventional method may include the use of horizontal slide rails which are punched during molding at the side walls of a receiving space of a computer housing so that components may be slid into the receiving spaces. Several screws would then be used to pass from the outer walls of the housing into pre-formed holes and into the component itself, such as a disk drive, in order to secure the component into position. Other methods utilizing various types of carriers for holding a component must also use screws to attach the component to the carrier.

Figure 1:
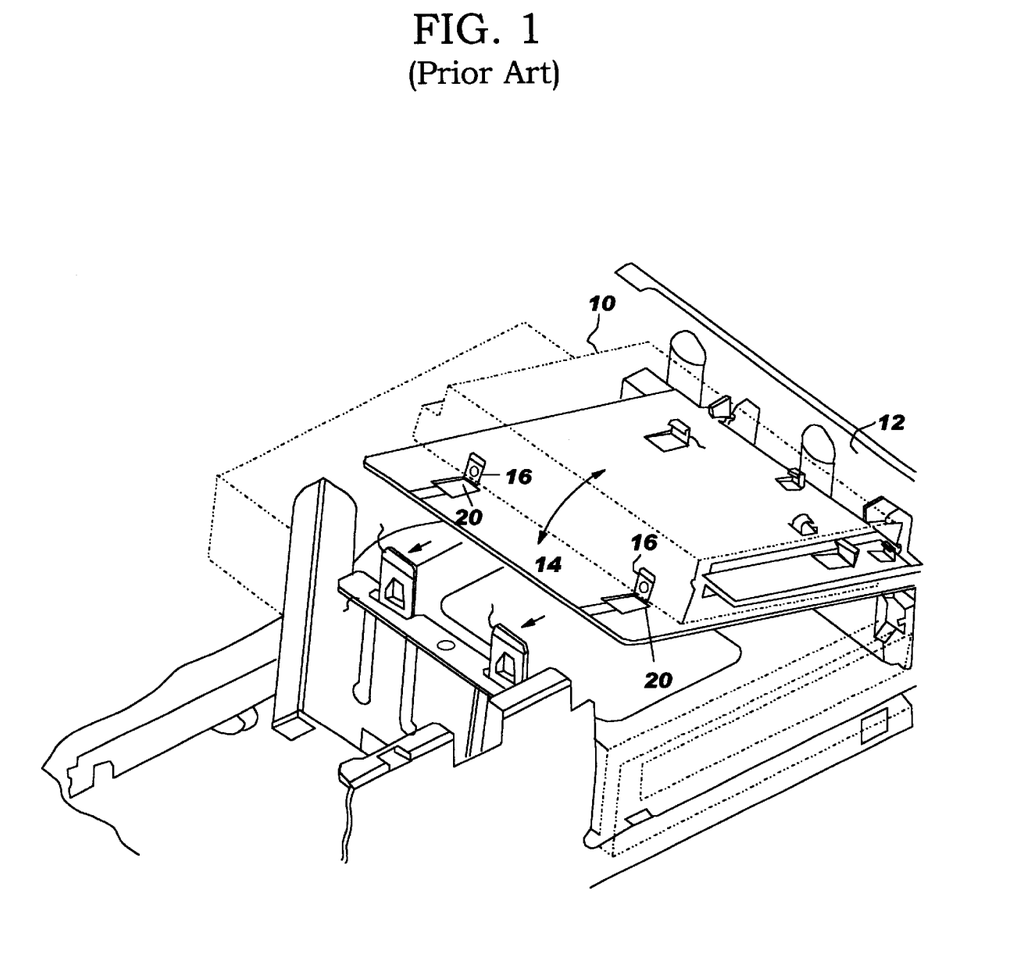
FIG. 1 is a perspective view of the embodiment of a conventional component.

For example, U.S. Pat. No. 5,768,099 by Radloff et al. entitled, "Computer With An Improved Disk Drive Mounting Assembly", issued Jun. 16, 1998, illustrates a conventional component assembly approach. FIG. 1 is a perspective view of the embodiment of the conventional component assembly. As depicted in FIG. 1, a component 10 is attached to a housing side wall 12 using a support plate 14 having tabs 16 located on the support plate 14. In this approach, tabs 16 engage the sides of a component 10 and two screws (not shown) are then used to secure the tabs 16 to each side of the component 10 by inserting them through mounting holes 20. In this approach the assembly requires several screws to attach the component to the support plate.

Such a conventional mounting method which uses several screws in the component assembly process is problematic because the screws are quite small and generally difficult to handle during the assembly process. Additionally, many manufacturers do not keep a tool on the build line of the assembly process for the tiny screws. Therefore, conventional component assembly using several screws is time consuming, and expensive from a manufacturing standpoint.

In U.S. Pat. No. 5,587,889 by Sacherman entitled, "Edge Connector For Securing A Mountable Electronic Component To A Device With Receiving Apertures For Edge Connector", issued Dec. 24, 1996, an assembly is described which minimizes the number of screws required.

Figure 2A:
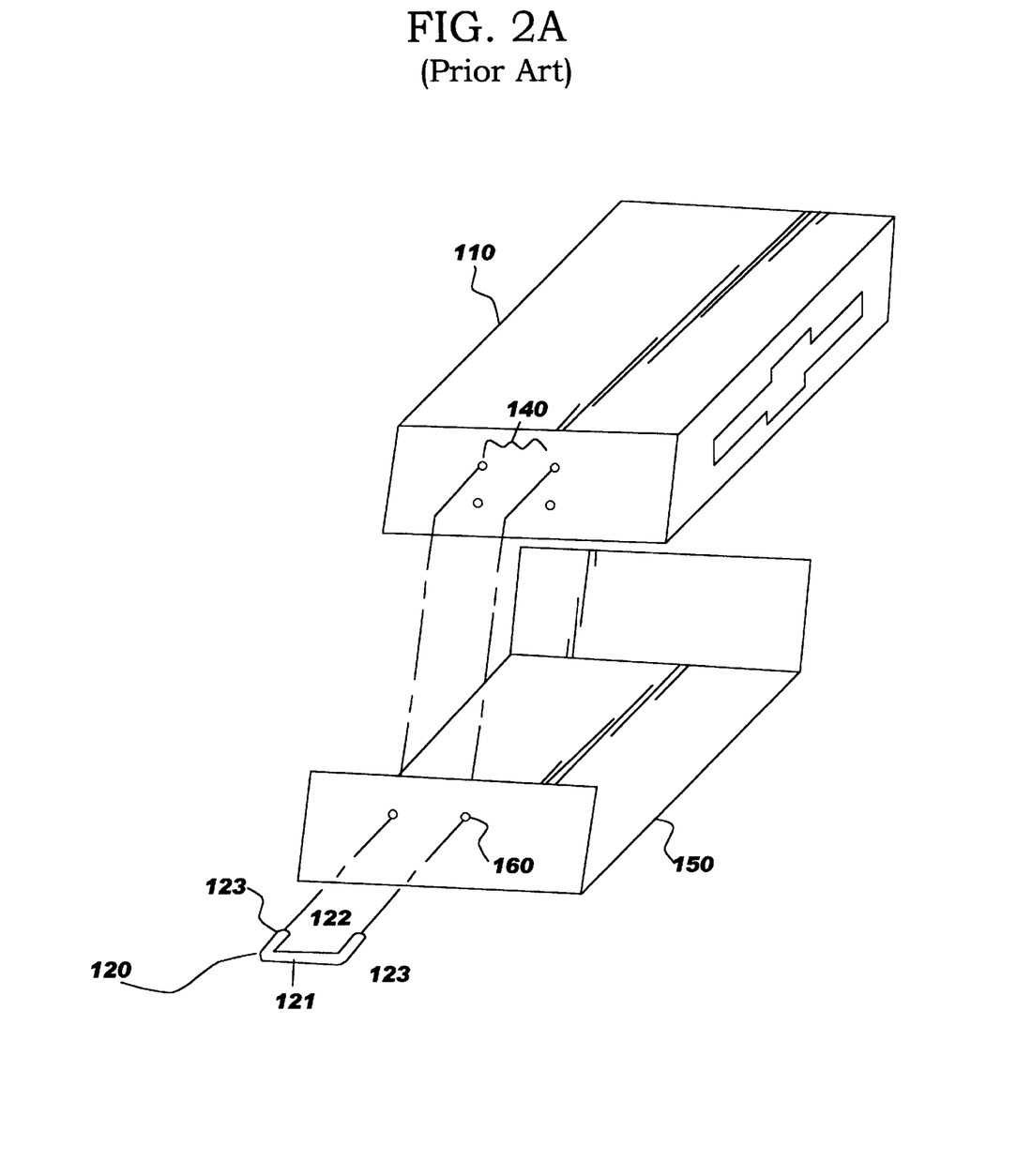
FIG. 2a is perspective view of a second embodiment of a conventional component assembly.
Figure 2B:
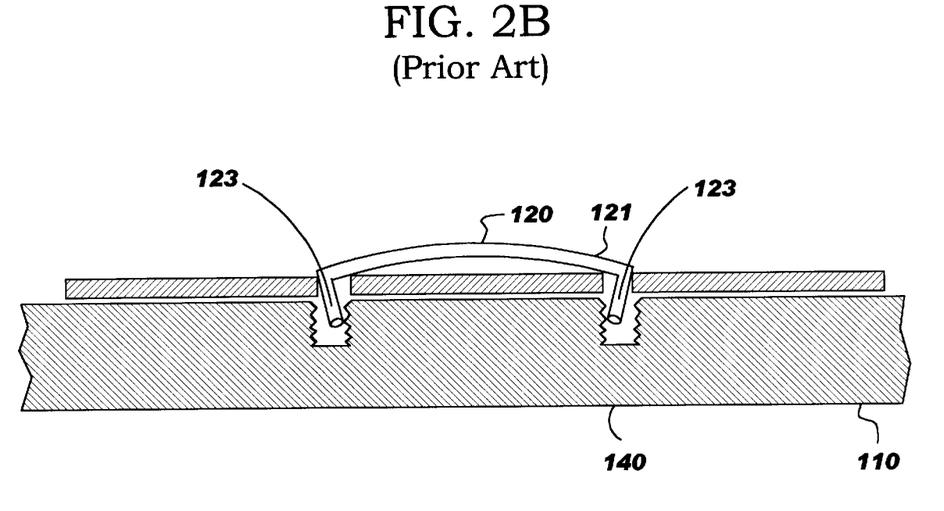

FIG. 2a is a perspective view of this conventional component assembly. FIG. 2b is a cross sectional view of an arch holding a component of the component assembly of FIG. 2a. Referring to FIG. 2a, arch 120 has a convex surface 121, a concave surface 122, and two legs 123. The arch 120 is engaged by applying force to the convex surface 121 so that legs 123 can be inserted into a carrier 150 and holes on the component. As shown in FIG. 2b, once the force is removed from the convex surface 121 and the arch 120 is released, the two 123 of the arch 120 retract to secure the component 110 within the mounting holes 140 of component 110.

This conventional assembly approach is problematic because the stability of the component assembly depends upon the tension of the arch which is formed by the concave and convex surfaces of the arch. Additionally, this assembly requires the use of either a pair of interlocking rails, or a carrier, in combination with two arches for attaching a component on each side.

Accordingly, what is needed is an improved component assembly which eliminates the use of the screws typically required to assemble components onto a mounting bracket and also allows for a very robust design when the assembly is mounted within a housing. The present invention addresses such a need.

SUMMARY OF THE INVENTION

A component assembly in accordance with the present invention is disclosed. In a first aspect, the assembly includes at least one component and a bracket for holding at least one component. The bracket has a first side, a second side, and formed features for holding at least one component to the first side of the bracket. The assembly includes a wire spring assembly for securing at least one component to the second side of the bracket.

In a second aspect, the component assembly comprises a first component and a second component. The component assembly further includes a bracket for holding the first and second components on the first and second sides of the bracket. The first and second sides of the bracket are oppositely disposed to each other. The bracket includes formed features on the first and second sides for retaining the first and second components. The system further includes first and second wire spring assemblies on each of the first and second sides for securing the first and second components to the bracket.

Accordingly, an improved assembly for components and method for mounting is described which overcomes the problems of conventional component assembly and mounting methods. By providing an assembly for components utilizing an improved bracket designed with formed features, and a wire spring assembly, the use of screws associated with mounting the components are minimized. In addition, the components can be attached to the bracket quickly and easily. The assembly is less expensive since the number of parts necessary for assembly is reduced. Finally, the design of the bracket allows for a robust design when mounting the component assembly within a housing.

BRIEF DESCRIPTION OF THE DRAWINGS

FIG. 2b is a cross sectional view of an arch holding a component of the component assembly of FIG. 2a.

FIG. 6 illustrates the bottom side of the bracket of FIG. 5a.

DETAILED DESCRIPTION

The present invention relates to an improved component assembly capable of being mounted within a housing. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

Figure 3:
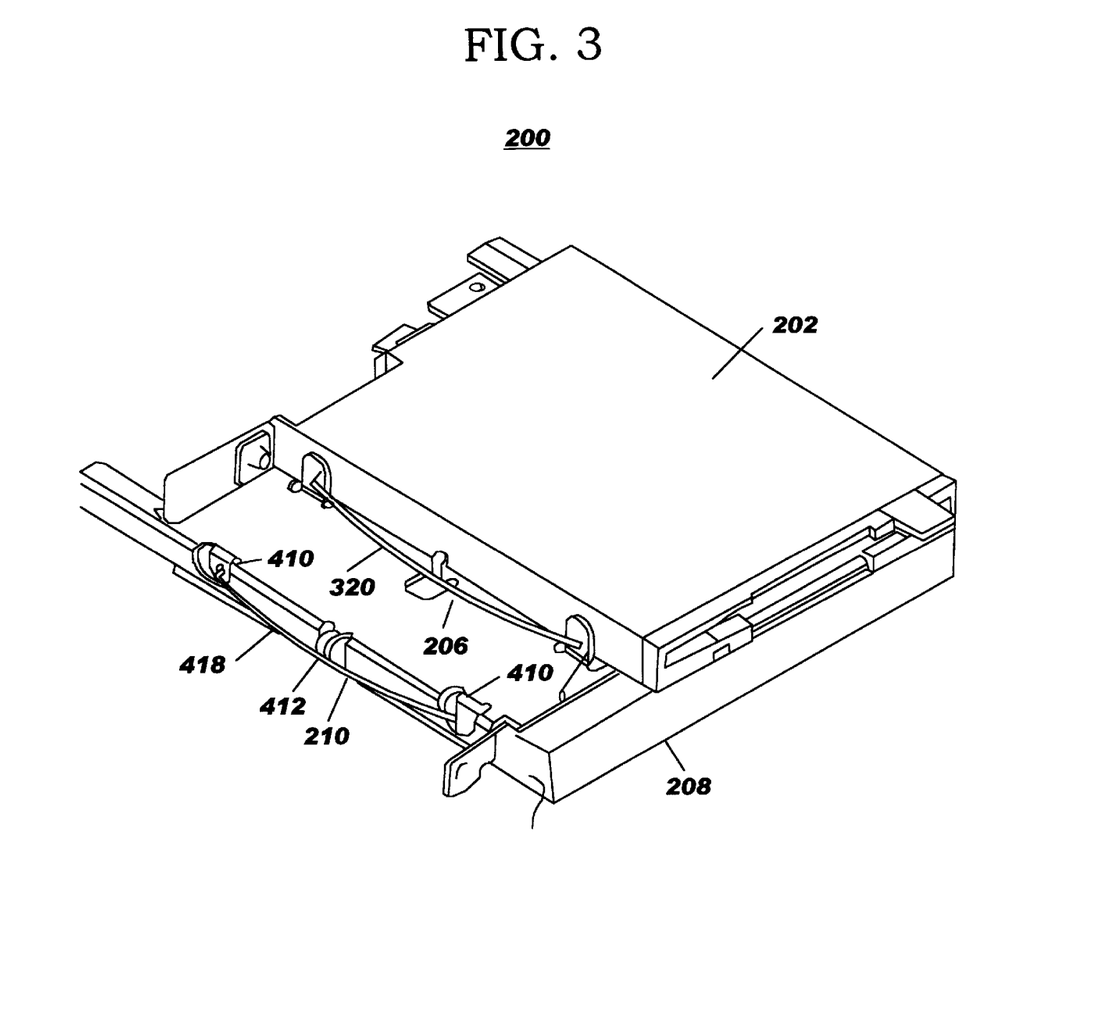
FIG. 3 illustrates a perspective view of a dual component assembly in accordance with the present invention.
Figure 4:
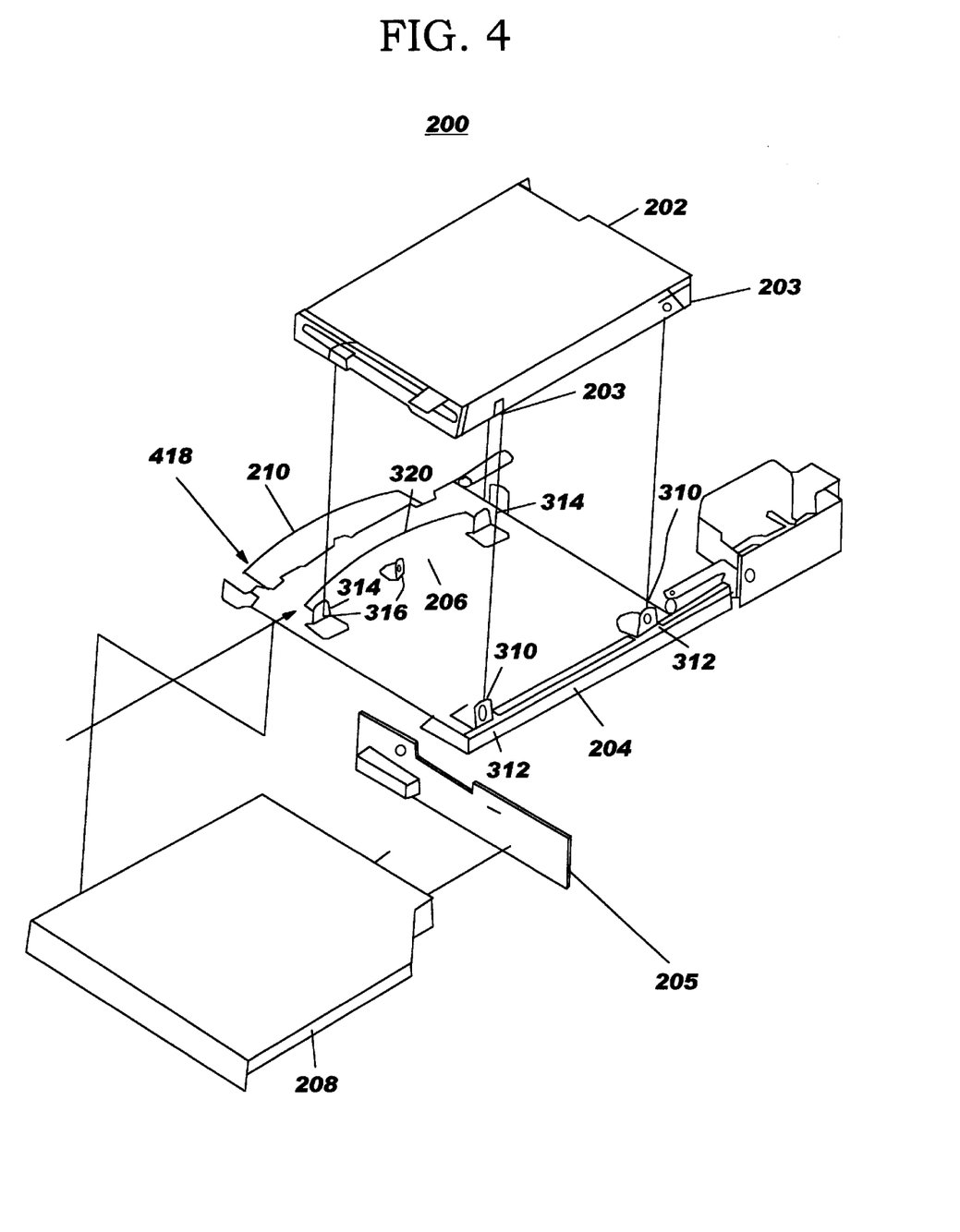
FIG. 4 illustrates an exploded view of the component assembly of FIG. 3.

FIG. 3 illustrates a perspective view of a dual component assembly in accordance with the present invention. FIG. 4 illustrates an exploded view of the component assembly of FIG. 3. Referring to FIGS. 3 and 4 together, in this embodiment the dual component assembly 200 includes a first component 202, floppy disk drive, and a bracket 204 coupled to a first component 202 by formed features and a first wire spring assembly 206. In this case a second component 208, a CD-ROM drive, and CD ROM/CD interposer card 205, is coupled to the bracket 204 by formed features and a second wire spring assembly 210. Typically this component assembly is then mounted in a housing for a computer or the like.

It should be understood that although the present invention is being described in a preferred embodiment in the context of a dual component assembly, one of ordinary skill in the art readily recognizes that the principles described herein could apply to many types of component assembly systems and its use would be within the spirit and scope of the present invention. Specifically, a system in accordance with the present invention could be utilized in an assembly, which one or a greater number of components, and the principals of the assembly, would be within the spirit and scope of the present invention. In addition, in a preferred embodiment, the first and second components are a slim CD-ROM drive and a slim floppy disk drive, but one of ordinary skill in the art recognizes the components could be another type.

Figure 5A:
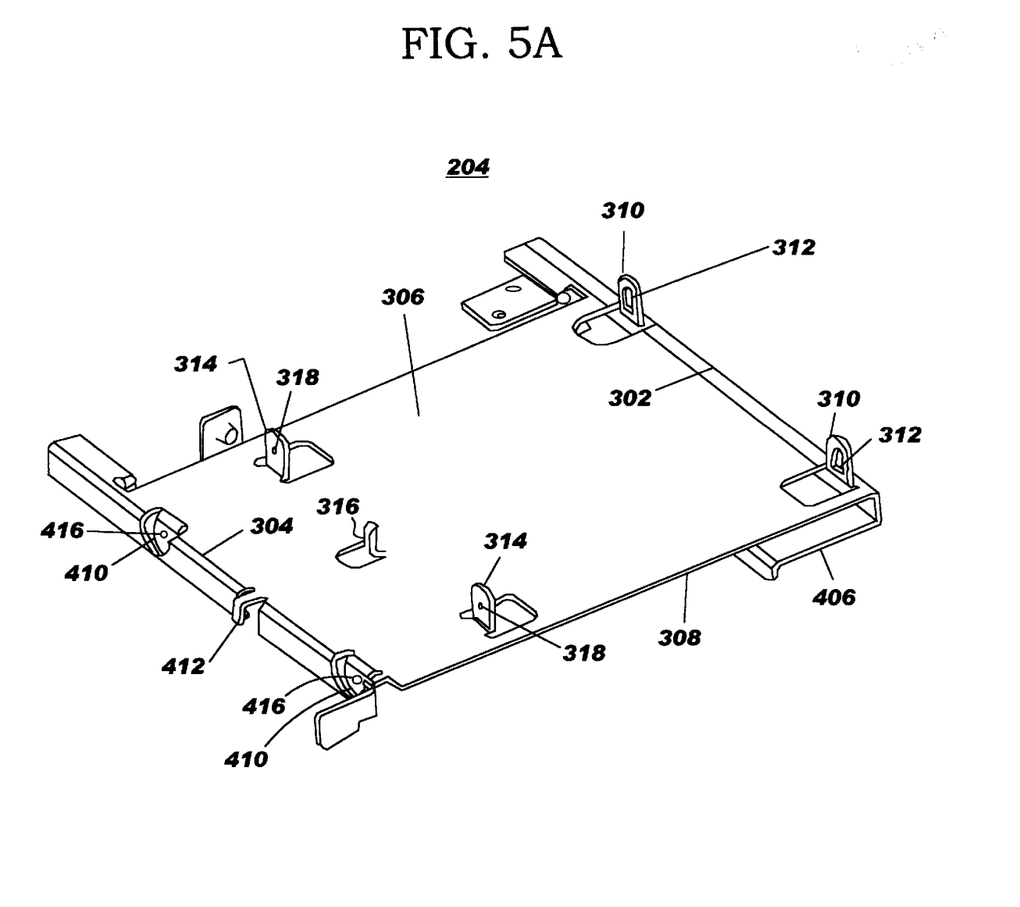
FIG. 5a illustrates a perspective view of the bracket of the present invention.
Figure 5B:
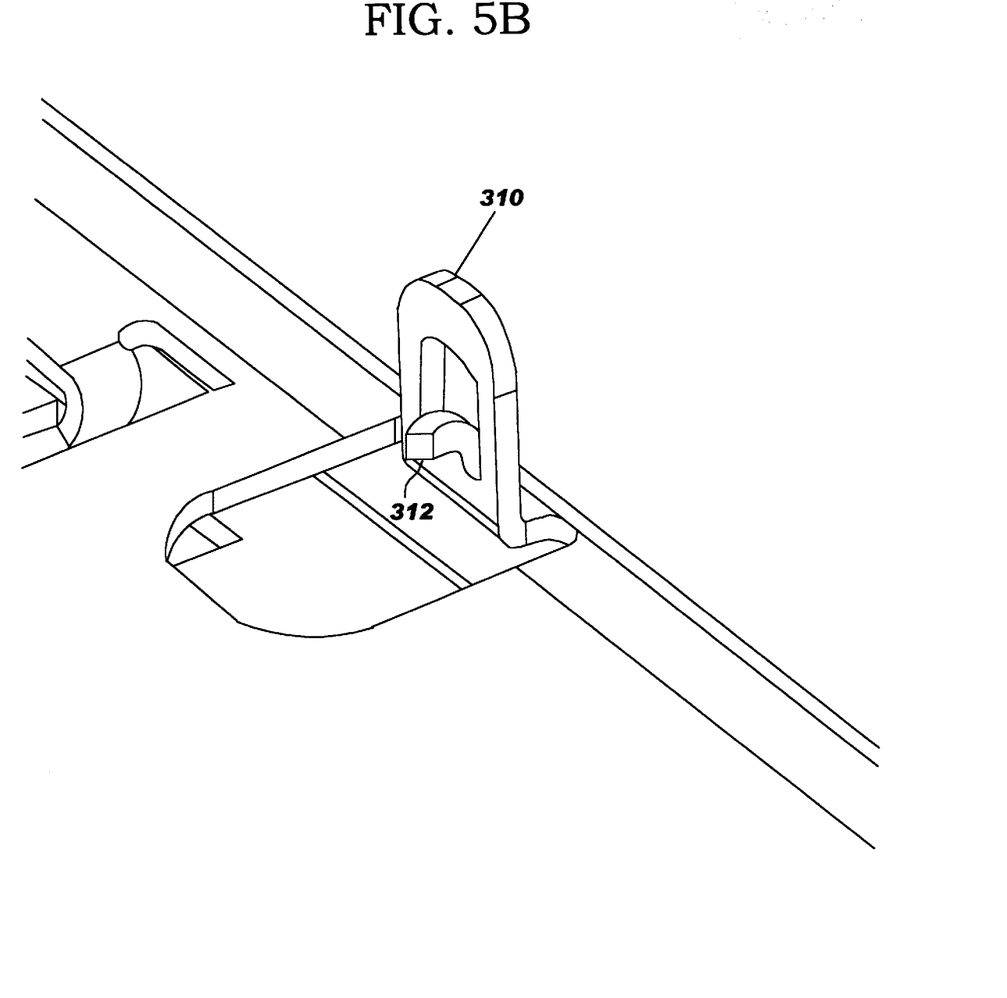
FIG. 5b illustrates a close-up view of formed features of the improved bracket.

To more particularly describe the present invention, refer now to the following description in conjunction with the accompanying figures. First, the bracket 204 will be described in detail. FIG. 5a illustrates a perspective view of the bracket 204 of the present invention. As is shown, the bracket 204 has a first side 302, a second side 304, a top side 306 and a bottom side 308. The bracket 204 is preferably fabricated from sheet metal, although other suitable materials may be used. The bracket 204 has formed features including the locator tabs 310 on the first side 302. The locator tabs 310 extend upwards from the top side 306 and hold one component in position both vertically and horizontally. The bracket 204 also includes formed features which include holding tabs 314 and latching tab 316 on the second side 304 of the bracket 204. Holding tabs 314 extend upwards from the bracket 204 and contain apertures 318. The locator tabs 310 include insertion prongs 312 which protrude out from locator tabs 310. FIG. 5b depicts a close-up view of one of the insertion prongs 312 which is of a size suitable for insertion into a standard size mounting hole of the component.

Referring to FIGS. 4 and 5a together, insertion prongs 312 on a first side 302 of the bracket 204 enter the mounting holes 203 on the component 202. Insertion prongs 312 locate component 202 both vertically and horizontally. The holding tabs 314 and latching tab 316 on the second side 304 of the bracket 204, in conjunction with a wire spring 320, provide for a wire spring assembly 206. The wire spring assembly 206 secures the component 202 to the bracket 204.

Figure 6:
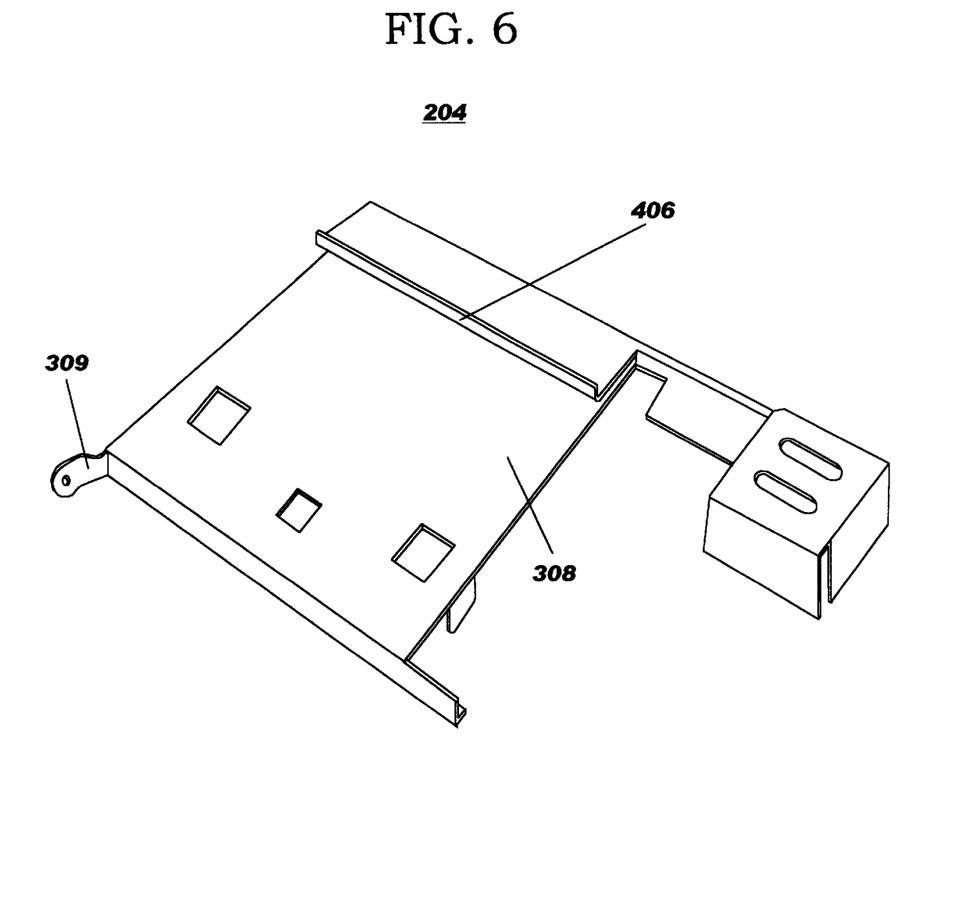

FIG. 6 illustrates the bottom side of the bracket 204 of FIG. 5a. The formed features of the bracket 204 allows for the attachment of a second component 208 (FIG. 4) to the bottom side 308 of bracket 204. As is shown, bracket 204 includes a ramped guide 406 located on the bottom side 308. The second component 208 can be assembled onto the bracket 204 by sliding it into the ramped guide 406 of the bracket 204. Referring back to FIG. 5a, the bracket 204 has features including the holding tabs 410 and the latching tab 412 on the bracket 204. The holding tabs 410 include apertures 416 thereon. Referring back to FIG. 3, the latching tab 412 extends downwardly from the surface of the bracket 204. The second component 208 is attached to the bracket 204 by inserting the wire spring 418 through the apertures 416 of the holding tabs 410, and into the mounting holes (not shown) of the second component 208. The wire spring 418 is then extended over the latching tab 412 to assemble the second component 208 onto the bracket 204 to form the wire spring assembly 210.

Figure 7:
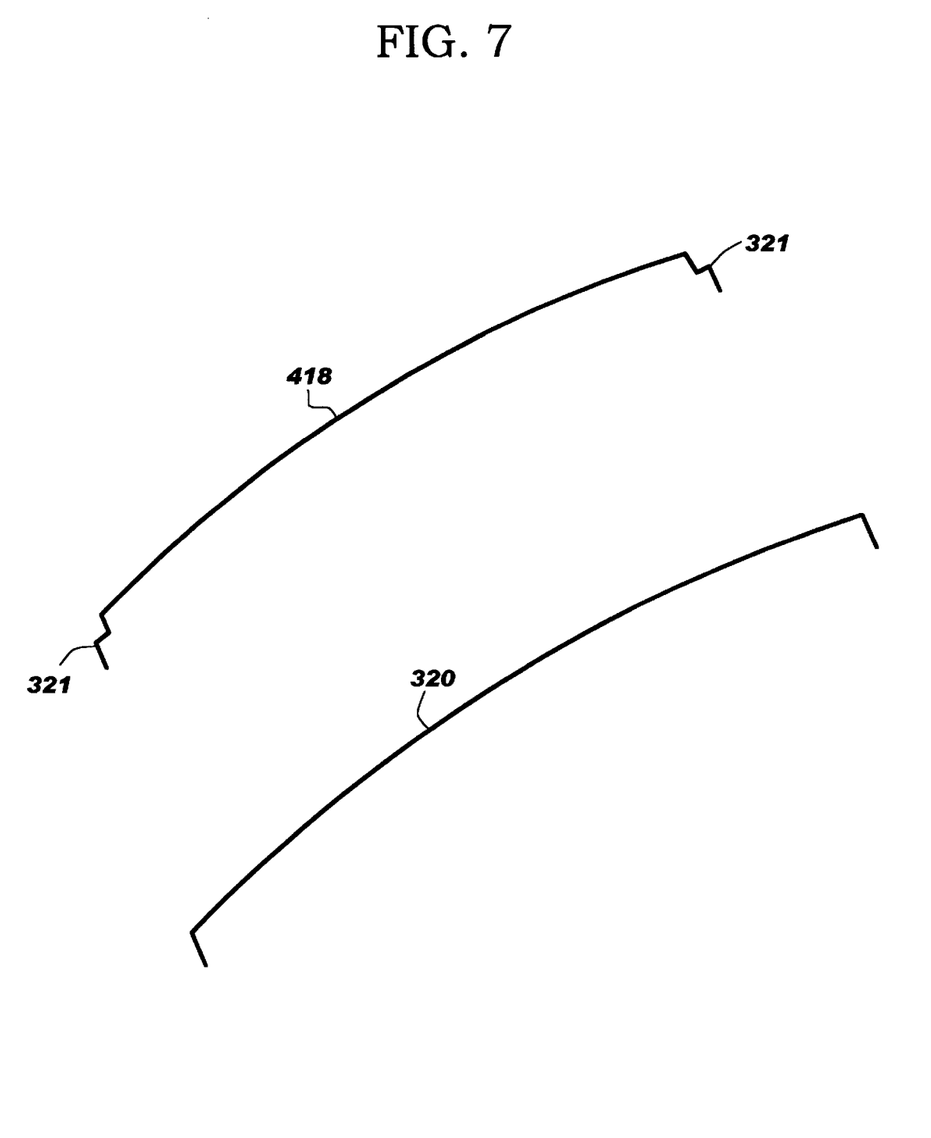
FIG. 7 illustrates a close-up side view of two versions of the wire springs.

FIG. 7 illustrates a close-up view of the wire springs 320 and 418. As is shown in FIG. 7 and FIG. 4, the wire spring 418 has bent portions 321 on each end thereof to accommodate the locating tabs thereon and is used to secure component 208. As is shown in FIG. 3, the wire spring 320 is used to secure the component 202. Accordingly, an improved assembly for components and method for mounting is described which overcomes the problems of conventional component assembly and mounting methods.

In a system in accordance with the present invention, the bracket includes a formed feature for holding components thereto and a wire spring assembly which is used in place of screws to secure the component. The form factor of the wire springs provides for good retention and ease of installation. An embodiment of the component assembly may be mounted within a computer housing. A system in accordance with the present invention the number of parts required for component assembly, and provides for a robust design.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A component assembly comprising:
   at least one component;
   a bracket for holding the at least one component; the bracket having a top side and a bottom side, the top side including a first side, a second side and at least one formed feature for holding the at least one component to the first side of the bracket; and
   a wire spring assembly for securing the component to the second side of the bracket.

2. The assembly of claim 1, wherein the at least one component is a floppy disk drive.

3. The assembly of claim 1, wherein the at least one component is a CD ROM drive.

4. The assembly of claim 1, wherein the at least one formed feature includes at least one tab for locating the component.

5. The assembly of claim 1, wherein the at least one formed feature includes at least one tab for positioning the component on the bracket.

6. The assembly of claim 1, wherein the at least one formed feature includes at one insertion prong for engaging the component to position the component onto the bracket, and for holding the component in position.

7. The assembly of claim 1, wherein the at least one formed feature includes at least one ramped guide for holding the at least one component.

8. The assembly of claim 1, wherein the wire spring assembly further comprises:

at least one latching tab;

at least one holding tab, wherein the at least one holding tab is capable of having at least one aperture; and a wire spring, wherein the wire spring is capable of being inserted through the at least one aperture, wherein the wire spring is formed around the at least one latching tab for securing the at least one component to the bracket.

9. component assembly comprising:

a first component;

a second component;

a bracket for holding the first and second components on first and second sides of the bracket, the first and second sides of the bracket being oppositely disposed to each other; the bracket including a plurality of formed features on the first and second sides for retaining the first and second components; and first and second wire spring assemblies on each of the first and second sides for securing the first and second components to the bracket.

10. The assembly of claim 9, wherein the first component is a floppy disk drive.

11. The assembly of claim 9, wherein the plurality of formed features includes at least one tab for locating the first and second components.

12. The assembly of claim 9, wherein the plurality of formed features includes at least one tab for positioning the first and second components on the bracket.

13. The assembly of claim 9, wherein the plurality of formed features includes at least one insertion prong for engaging the first and second components to position the first and second components onto the bracket, and for holding the first and second components in position.

14. The assembly of claim 9, wherein each of the first and second wire spring assemblies includes:

at least one latching tab;

at least one holding tab, wherein the at least one holding tab is capable of having at least one aperture; and a wire spring, wherein the wire spring is capable of being inserted through the at least one aperture, wherein the wire spring is formed around the at least one latching tab for securing one of the components to the bracket.

15. The assembly of claim 10, wherein the second component is a CD ROM/CD interposer card unit.

16. The assembly of claim 15, wherein the plurality of formed features includes a ramped guide for holding the CD ROM/CD interposer card unit onto the bracket.

17. A method for mounting a component assembly within a housing comprising:

providing a bracket having a top side and a bottom side, the top side including a first side, a second side, and at least one formed feature;

providing at least one component;

attaching the at least one component to the first side of the bracket using the at least one formed feature of the bracket;

providing a wire spring assembly for securing the component to the second side of the bracket; and mounting the component assembly within a housing.

18. The method of claim 17, wherein the component is a floppy disk drive.

19. The method of claim 17, wherein the at least one formed feature of the bracket includes at least one ramped guide for holding a slim CD ROM/CD interposer card combination onto the bracket.

20. The method of claim 17, wherein the at least one formed feature of the bracket includes at least one tab for holding at least one drive both vertically and horizontally.

21. The method of claim 17, wherein a second component is a CD ROM capable of being coupled to a CD interposer card.

22. A component assembly comprising:

a floppy disk drive;

a CD-ROM drive/CD interposer card;

a bracket for holding the floppy disk drive and CD-ROM drive/CD interposer card on first and second sides of the bracket, the first and second sides of the bracket being oppositely disposed to each other; the bracket including a plurality of formed features on the first and second sides for retaining the floppy disk drive and CD-ROM drive/CD interposer card; wherein the plurality of formed features includes a ramped guide for holding the CD-ROM drive/CD interposer card onto the bracket; wherein the plurality of formed features includes at least one tab for locating the floppy disk drive and CD-ROM drive/CD interposer card; wherein the plurality of formed features include at least one tab for positioning one of the floppy disk drive and CD-ROM drive/CD interposer card on the bracket; wherein the at least one formed feature includes at least one insertion prong for engaging one of the floppy disk drive and CD-ROM drive/CD interposer card to position the one of the floppy disk drive and CD-ROM drive/CD interposer card onto the bracket, and for holding the one of the floppy disk drive and CD-ROM drive/CD interposer card in position; and first and second wire spring assemblies on each of the first and second sides for securing the floppy disk drive and CD-ROM drive/CD interposer card to the bracket; wherein each of the first and second wire spring assemblies includes: at least one latching tab; at least one holding tab, wherein the at least one holding tab is capable of having at least one aperture; and a wire spring, wherein the wire spring is capable of being inserted through the at least one aperture, wherein the wire spring is formed around the at least one latching tab for securing one of the floppy disk drive and CD-ROM drive/CD interposer card to the bracket.

* * * * *